(No Model.)
G. MITCHELL.
PROCESS OF REFINING VEGETABLE OILS.
No. 575,756. Patented Jan. 26, 1897.
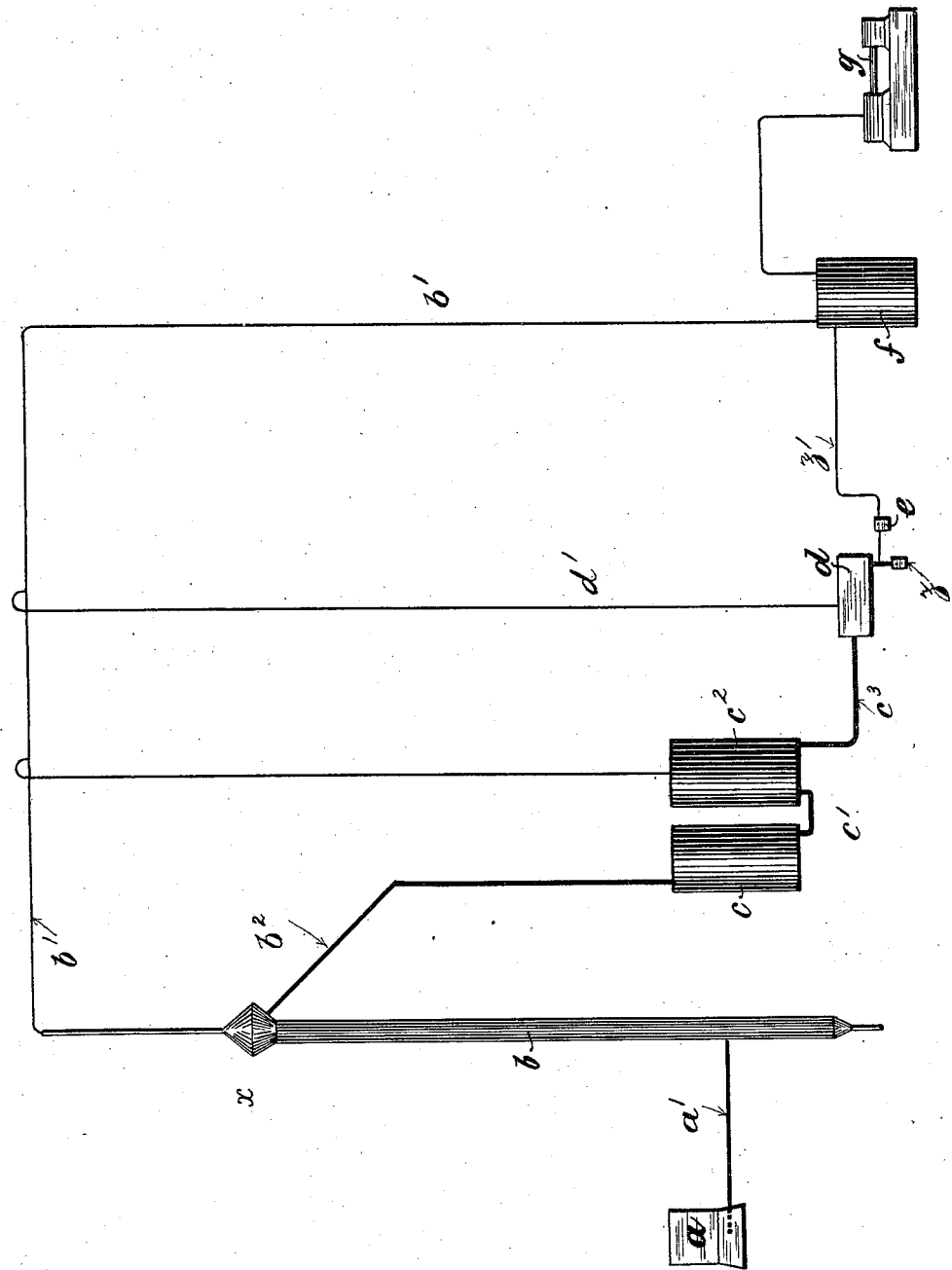
WITNESSES.
Horace E. Gowers.
S. Clark
INVENTOR.
George Mitchell
BY W. J. Munden
HIS ATTORNEY.

UNITED STATES PATENT OFFICE.

GEORGE MITCHELL, OF LONDON, ENGLAND.

PROCESS OF REFINING VEGETABLE OILS.

SPECIFICATION forming part of Letters Patent No. 575,756, dated January 26, 1897.

Application filed November 29, 1895. Serial No. 570,528. (No specimens.) Patented in England May 5, 1895, No. 9,153; in Italy June 21, 1895, No. 39,115/211; in France June 24, 1895, No. 248,402, and in Belgium July 5, 1895, No. 116,411.

*To all whom it may concern:*

Be it known that I, GEORGE MITCHELL, a subject of the Queen of Great Britain, residing at 47 Victoria Street, Westminster, London, in the county of Middlesex, England, have invented a new or Improved Process for the Treatment and Refining of Vegetable Oils During or Subsequent to their Expression from Nuts, Beans, Seeds, and the Like, (for which I have obtained a patent in Great Britain, No. 9,153, dated May 5, 1895; in France, No. 248,402, dated June 24, 1895; in Belgium, No. 116,411, dated July 5, 1895, and in Italy, No. 39,115/211, dated June 21, 1895,) of which the following is a specification.

Many vegetable oils have an extremely unpleasant flavor, although expressed from nuts, beans, seeds, or fruit which are not only free from such objectionable smell and taste, but are actually agreeable to the ordinary palate. This is most marked in the case of castor-oil, the seeds of the *Ricinus communis* from which it is expressed having, unless very old, a pleasant nutty flavor, while the oil itself is nauseous in the extreme. The reactions which lead to this change are caused by moisture, air, and heat, which singly or conjointly produce fermentation or oxidation, and the consequent deterioration of the oil.

Now this invention has for its object the production of castor, olive, and similar vegetable oils free from these defects; and it consists in subjecting the oil to the necessary treatment in chambers or vessels from which the air and natural moisture have been extracted, and without at any period of its treatment allowing the temperature of the oil to reach the point of fermentation, thus conducting the whole of the operations involved in the process, subsequent to or including the pressing, *in vacuo*, by which means the oil is freed from its natural moisture without any chemical change or fermentative action having been set up. The temperature must not in any case exceed 120° Fahrenheit and as perfect a vacuum as possible should be obtained.

The essential feature of the invention consists in receiving the oil as soon as it flows from the nuts, beans, seeds or fruits, or from the press which expresses it from them into a vessel or series of vessels in which is maintained a vacuum, and from which the oil can be drawn into bottles inside which a vacuum has been produced. Any necessary treatment can be given between the press and the bottling, such as filtration, provided it can be conducted *in vacuo*, it being understood that the oil as soon as it is expressed from the seed, or as soon as it flows from the press which effects this purpose, is drawn into a vacuum, which is maintained in all the vessels through which it passes until it is bottled, and that the whole of the chain of operations is conducted in a temperature below that which is necessary to produce fermentation and without the addition of moisture.

A suitable chain of operations, all of which may be conducted *in vacuo*, is as follows: The press used for expressing the oil is preferably of the type described in my British patent, No. 16,259, dated September 10, 1892, and this or any other press used may be inclosed in such manner that the oil as soon as expressed is received into a vacuum-chamber; but in general the press is open to the air, and the expressed oil flows from it into a receptacle, from which it is drawn into the first of the series of vessels in which the process is carried out. This first vessel is a suitable filter so arranged as to remove all the solid impurities which can be removed by mechanical means, and upon a vacuum being formed in the outflow-pipe of this filter the oil is sucked or drawn through it and thereby filtered. It then passes into one or more cylindrical or other shaped vessels, in which it remains a sufficient time for the water or other moisture which is naturally present to be extracted by means of the vacuum which is maintained in these vessels at the surface of the oil. The refined oil is then drawn or sucked into the bottling vessel or apparatus, which may be of any suitable type, and in which the oil is contained in a reservoir, the upper part of which is in connection with a vacuum vessel or pumps which, having exhausted the air from the bottling apparatus or reservoir, maintains a vacuum in the whole of the vessels in which the chain of operations is conducted, which vacuum serves to draw the oil forward from one vessel to the other. The upper part of the vessels in which the natural moisture is extracted are placed in connection with the vacuum vessel or pump by an independent pipe which takes away the moisture and which is so arranged and connected to the vessels that none of this moisture can, when once extracted from the oil, drop back upon or into it. The under side of the bottling apparatus has one or more cocks so arranged that a nozzle engages with the mouth of a bottle and forms an airtight joint therewith, so that a vacuum being first produced in the bottle by placing it in connection with the vacuum vessel or pump the bottling-reservoir is next opened to the bottle, which is thus filled with oil and ready to be corked.

In the accompanying drawing I illustrate, diagrammatically, the arrangement of a number of vessels in which a series or chain of operations are carried on according to my invention.

$a$ designates the press, which is used for the purpose of expressing the oil from the nuts, beans, seeds, or other like substances. This press may either be inclosed in a vacuum-chamber, in which case the oil as soon as it is expressed is received into a vacuum, or it (the oil) may be caught as soon as it leaves the press in a vessel from which it is drawn into a pipe $a'$, which leads to the interior of a vessel $b$. In this vessel the oil is subjected, while passing upward, to the action of a vacuum produced by air-pumps $g$, which serve to exhaust the vessel $f$, and this communicates with the vessel $b$ through the pipe $b'$. The pipe $b'$ is continued upward to such a height that oil can never reach the top, but as soon as it reaches the height of the conical vessel $x$ it flows off down the pipe $b^2$ into the first filter $c$, thence through the pipe $c'$ to the second filter $c^2$, and through the pipe $c^3$ to the bottling apparatus $d$. The interior of this bottling apparatus is connected with the vacuum-pipe $b'$ by the pipe $d'$, thus producing a vacuum above the oil contained therein. The bottle $z$ is filled by means of a special description of cock which, being connected with the vacuum vessel $f$ by means of a pipe $z'$ and trap $e$, permits, first, of a vacuum being created in the interior of the bottle and afterward of the bottle being placed in connection with the oil in the vessel $d$, so as to fill the bottle with the oil. The oil can thus flow continuously through the pipe $a'$, through the vessels $b$ and $x$, wherein the moisture is extracted and carried as a vapor to the pipe $b'$. The oil meantime flows down the pipe $b^2$, through the filters $c$ and $c^2$ to the bottling apparatus $d$, without having been exposed to the atmosphere. In case of heat being applied to the vessel $b$ (never exceeding 120° Fahrenheit) it is applied to the exterior by a casing surrounding it, so that no steam or water is allowed to come into contact with the oil.

Having fully described my invention, what I desire to claim and secure by Letters Patent is—

The process of treating and refining vegetable oils which consists in expressing the oil from the seeds or other material, submitting it to the action of a vacuum in a suitable vessel wherein it is freed from any air or moisture it may contain, removing any impurities by mechanical means, such as filtering under a vacuum, ultimately allowing the purified oil to pass to a receiver, and then while subject to a vacuum drawing it off into bottles from which the air has previously been exhausted, substantially as described.

In witness whereof I have signed this specification in presence of two witnesses.

GEORGE MITCHELL.

Witnesses:
W. M. HARRIS,
JOSEPH LAKE.